(12) United States Patent
Luss et al.

(10) Patent No.: US 8,774,627 B2
(45) Date of Patent: Jul. 8, 2014

(54) NETWORK RESTORATION UNDER LINK OR NODE FAILURE USING PRECONFIGURED VIRTUAL CYCLES

(75) Inventors: Hanan Luss, Marlboro, NJ (US); Martin Eiger, Montville, NJ (US); David Shallcross, Piscataway, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 190 days.

(21) Appl. No.: 13/587,495

(22) Filed: Aug. 16, 2012

(65) Prior Publication Data
US 2012/0328282 A1    Dec. 27, 2012

Related U.S. Application Data

(63) Continuation of application No. 12/388,981, filed on Feb. 19, 2009, now Pat. No. 8,275,260.

(51) Int. Cl.
*H04J 14/02*    (2006.01)
(52) U.S. Cl.
USPC ............................................................. 398/57
(58) Field of Classification Search
USPC ............................................................. 398/57
See application file for complete search history.

(56) References Cited

PUBLICATIONS

Toward jointly optimized design of failure-independent path-protecting p-cycle networks. Dimitri Baloukov, Wayne D. Grover, and Adil Kodian. Journal of Optical Networking vol. 7, No. 1 / Jan. 2008.
Fast Optical Layer Mesh Protection Using Pre-Cross-Connected Trails. Timothy Y. Chow, Fabian Chudak, and Anthony M. French.
IEEE/ACM Transactions on Networking, vol. 12, No. 3, Jun. 2004.
Sonet Toolkit: A Decision Support System for Designing Robust and Cost-Effective Fiber-Optic Networks. Steven Cosares, David N . Deutsch, Iraj Saniee, Ondria J. Wasem Interfaces 25: Jan. 1-Feb. 1995 (pp. 20-40).
Improved method for survivable network design based on pre-cross-connected trails. Aden Grue and Wayne D. Grover. Journal of Optical Networking vol. 6, No. 2 / Feb. 2007.
Wavelength routing and assignment in a survivable WDM mesh network. Jeffery Kennington; Eli Olinick; Augustyn Ortynski; Gheorghe Spiride Operations Research; Jan./Feb. 2003.
A. Kodian, W. D. Grover, J. Doucette, "A Disjoint Route-Sets Approach to Design of Path-Protecting p-Cycle Networks," Proc. Workshop on Design of Reliable Communication Networks (DRCN 2005), Ischia (Naples), Italy, pp. 231-238, Oct. 16-19, 2005.
Survivable Telecommunications Network Design Under Different Types of Failures. Hanan Luss and Richard T. Wong. IEEE Transactions on Systems, Man, and Cybernetics—Part A: Systems and Humans, vol. 34, No. 4, Jul. 2004.

*Primary Examiner* — Danny Leung
(74) *Attorney, Agent, or Firm* — Philip J. Feig (57) ABSTRACT

The design of telecommunication networks is such that there is provision of end-to-end path protection to multiple demands under a single link or node failure in the networks. Restoration routes are provided on Preconfigured Virtual Cycles (PVC's), where each demand is assigned one restoration route and specific restoration wavelengths on a segment of one cycle. Multiple demands may share restoration wavelengths, and the number of restoration wavelengths may vary among the PVC links. First, a plurality of candidate PVC's are generated where each demand may be assigned to multiple candidates. Assignment of demands with common failure scenarios are allowed, under certain conditions, to the same PVC. Next, a set of PVC's is selected from among the candidates, while minimizing total reserved restoration capacity and ensuring that all demands are protected. Next duplicate assignments are eliminated. Finally, conflicts of wavelength assignments are resolved. The invention focuses primarily on optical networks.

30 Claims, 2 Drawing Sheets

NETWORK RESTORATION UNDER LINK OR NODE FAILURE USING PRECONFIGURED VIRTUAL CYCLES

CROSS-REFERENCE TO RELATED APPLICATIONS

This application is a continuation of pending U.S. patent application Ser. No. 12/388,981, filed Feb. 19, 2009.

FIELD OF THE INVENTION

The present invention relates to the design of telecommunications networks where demands are protected from a single link or node failure. Specifically, the invention relates to the design of preconfigured cycles used to restore affected demands instantaneously in the event of a failure where the restoration capacity on the cycles can be shared by different demands. The invention focuses primarily on optical networks.

BACKGROUND OF THE INVENTION

Modern telecommunications networks transport an enormous amount of information. Current optical networks are already capable of transporting 100 channels on a single optical fiber, where each channel can carry 40 gigabits per second. Since companies, government agencies, and the military are dependent on receiving uninterrupted service, instantaneous service restoration in the event of link or node failures has become critically important. Even service interruptions for small durations may cause significant disruptions to the exchange of information and may lead to significant financial losses and to inability of executing mission critical tasks.

This invention focuses on optical networks where almost instantaneous restoration in the event of network failures is critically important. Providing dedicated restoration capacity to each of the demands would provide adequate protection, but would be prohibitively expensive. Numerous papers discuss providing protection through variants of shared mesh restoration methods where restoration capacity can be shared by multiple demands with diverse working routes (i.e., with diverse original provisioned routes); for example, the paper by J. Kennington, E. Olinick, A. Ortynski, and G. Spiride, "Wavelength Routing and Assignment in a Survivable WDM Mesh Network", *Operations Research* 51, 67-79, 2003. Shared mesh restoration methods use restoration capacity efficiently at the expense of requiring switching and wavelength conversions along intermediate nodes of restoration routes. Furthermore, these methods may require extensive real-time quality testing of end-to-end restoration routes in order to guarantee adequate transmission integrity. Therefore, meeting stringent restoration time requirements for end-to-end restoration routes with adequate quality may be quite challenging.

Preconfigured restoration methods that do not require intermediate switching and wavelength conversions along restoration routes are a topic of considerable research for optical networks. The challenge is to design preconfigured restoration capacity that can be shared by various demands in the event of a failure; thus, achieving almost instantaneous, reliable restoration, while still using much less restoration capacity than dedicated restoration routes. It should be noted that ring architectures have been widely used for Synchronous Optical Networks (SONET) and for Wavelength Division Multiplexing (WDM) networks; see, for example, the paper by S. Cosares, D N. Deutsch, I. Saniee, and O. J. Wasem, "SONET Toolkit: A Decision Support System for Designing Robust and Cost-effective Fiber-optics Networks", *INTERFACES* 25, No. 1, 20-40, 1995. The resulting networks consist of multiple interconnecting rings where both the demands' working routes and their respective restoration routes are restricted to use only the rings. Local demand may use only a single ring while long distance demands may be routed through multiple interconnected rings. This architecture guarantees very fast and reliable restoration at the expense of significant infrastructure capacity since, typically, working routes restricted to rings are significantly longer than the shortest possible routes and half of the ring capacities is reserved for restoration.

Combining the advantages of arbitrary, often referred to as mesh, working routes with preconfigured restoration methods that allow for capacity sharing without resorting to intermediate switching and wavelength conversions on restoration routes seems to be an attractive approach. A. Kodian and W. D. Grover, "Failure-Independent Path-Protecting p-Cycles: Efficient and Simple Fully Preconnected Optimal-Path Protection", *Journal of Lightwave Technology* 23, 3241-3259, 2005, A. Kodian, W. D. Grover, and J. Doucette, "A Disjoint Rout-Sets Approach to Design of Path-Protecting p-Cycle Networks", *Proceedings of Workshop on Design of Reliable Communication Networks (DRCN* 2005), 231-238, Naples, Italy, October 2005, and D. Baloukov, W. D. Grover, and A. Kodian, "Toward Jointly Optimized Design of Failure-Independent Path Protecting p-Cycle Networks", *Journal of Optical Networking* 7, 62-79, 2008, present a method for mesh working routes of the demands, where end-to-end restoration routes are provided on preconfigured cycles. In their method, referred to as the Failure Independent Path Protecting (FIPP) p-cycles method, multiple demands that do not have any common failure scenarios can be protected by the same cycle. However, their method does not support the assignment of demands with common failure scenarios on the same cycle. Furthermore, their method allows splitting restoration for multiple-wavelength demands across multiple routes in the same or different cycles.

T. Y. Chow, F. Chudak, and A. M. Ffrench, "Fast Optical Layer Mesh Protection Using Pre-Cross-Connected Trails", *IEEE/ACM Transactions on Networking* 12, 539-548, 2004, present a method that protects mesh working routes of the demands on restoration routes, referred to as trails, that are not constrained to be on cycles but are flexible to follow other structures such as paths with or without loops. Their method allows the sharing of restoration capacity of a trail by multiple demands that do not have any common failure scenario. Their method assigns one demand at a time, thus, constructing trails sequentially. Hence, the resulting design of trails depends on the order in which the demands are assigned. A. Grue and W. D. Grover, "Improved Method for Survivable Network Design Based on Pre-Cross-Connected Trails", *Journal of Optical Networking* 6, 200-216, 2007, applied their FIPP p-cycles method to designing trails for restoration. Again, a trail can support only demands with no common failure scenario and restoration routes of a demand may be split among multiple trails.

H. Luss and R. T. Wong, "Survivable Telecommunications Network Design Under Different Types of Failures", *IEEE Transactions—SMC, Part A: Systems and Humans* 34, 521-530, 2004, propose a method that constructs a single cycle that includes all end-nodes of the mesh routes of the demands. Restoration routes for all demands are constructed on the cycle using a pre-specified rule, such as using the shortest route on the cycle. Note that using a single cycle for restoring all demands may lead to inefficient use of capacity due to long restoration routes and the need to protect all demands on that cycle. The method was invented primarily for logical networks (e.g., IP-MPLS); in optical networks a single restoration cycle that includes all end-nodes of the demands may not even exist. Also, the method provides only restoration routes, but does not address the issue of wavelength assignments which is critical when demands that have common failures are assigned to the same cycle.

The present invention provides end-to-end path protection for demands with mesh routes in the network. Restoration routes are provided on segments of cycles where the end-nodes of a working route are the end-nodes of the restoration route for the corresponding demand on the cycle. The method allows multiple demands to share restoration capacity. These demands include those with no common failure scenarios as well as selective demands that do have common failure scenarios, thus achieving more effective use, of restoration capacity than previous methods. Also, the method provides a single restoration route for each of the demands which is often desired by users of optical networks as it simplifies considerable management of traffic at the end-nodes. Nevertheless, the method can readily be modified to allow for multiple restoration routes per demand.

SUMMARY OF THE INVENTION

The present invention designs survivable optical networks that provide end-to-end path protection from any single link or node failure on preconfigured cycles. The working routes of the demands are provided as input and are arbitrary. The restoration routes and the wavelengths assigned to each of these routes are preconfigured. Upon a link or node failure, affected demands are rerouted to their preconfigured restoration routes without any knowledge of the precise failure location. When an end-node of a demand fails, the demand is lost and cannot be restored. For each demand, only a cycle segment that connects its two end-nodes and has no overlapping links with the working route of the demand is used for restoration, where the restoration wavelengths assigned to the demand on its restoration route may be shared with restoration routes for other demands.

For each of the demands, the method generates multiple candidate cycles that can restore the demand on a segment of the cycle. The method attempts to assign additional demands to the candidate cycle, provided that they can be protected by the cycle. These include demands with no common failure scenarios (also referred to as disjoint demands), demands with common failure scenarios but non-overlapping restoration routes, and certain demands with common failure scenarios that can be protected on the cycle without increasing restoration capacity. Each of the restoration routes is also assigned specific wavelengths. Since the restoration route for each of the demands uses only a segment of the cycle, the number of restoration wavelengths that need to be reserved may differ on different links of the cycle. Hence, these cycles are referred to as Preconfigured Virtual Cycles (PVC's). The cost of a restoration wavelength on a link depends on the link length. Often, but not always, this cost is simply proportional to the link length.

Once all candidate cycles are generated for all demands, the method determines an optimal set of selected PVC's so that the total restoration wavelengths cost on restoration routes is minimized while each of the demands is assigned to at least one PVC. Thereafter, the method adjusts the solution so that each demand would be assigned to precisely one of the selected PVC's. Finally, the method resolves potential conflicts among restoration wavelengths and working routes wavelengths, and among restoration wavelengths assigned to restoration routes on adjacent PVC's.

The present invention uses restoration capacity more effectively than previous preconfigured restoration methods by facilitating the assignment of multiple demands, including certain demands with common failure scenarios, to a cycle where each demand uses a restoration route on only a segment of the cycle. It also enforces rerouting of each of the demands into a single restoration route, which is often required. The method can readily be modified to handle the case where demands can be rerouted onto multiple restoration routes.

The present invention will be more clearly understood when the following description is read in conjunction with the accompanying drawings.

DETAILED DESCRIPTION

Figure 1:
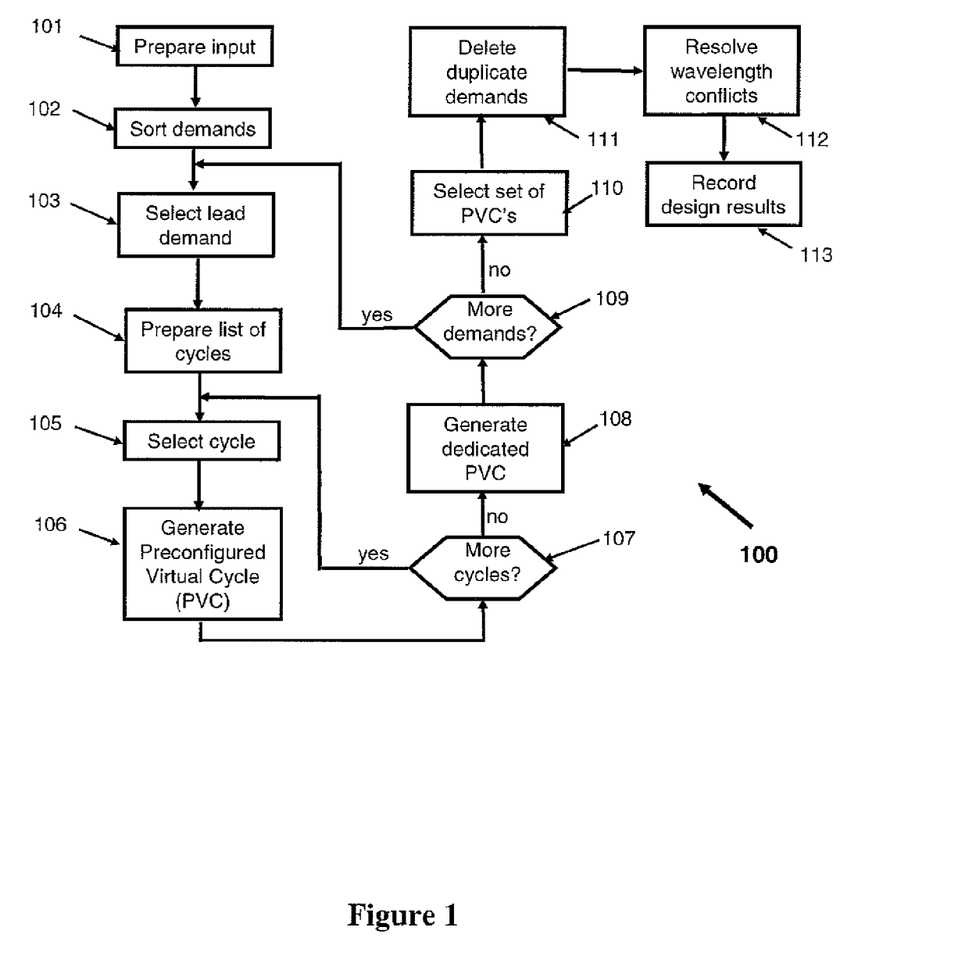
FIG. 1 is a flow chart of a method embodying the present invention that determines the selected set of preconfigured virtual cycles, the demands assigned to each of these cycles, and the restoration route and restoration wavelengths assigned to each of the demands.

The present invention designs survivable optical networks that provide end-to-end path protection from any single link or node failure. The restoration routes and the restoration wavelengths assigned to each of these routes are specified on Preconfigured Virtual Cycles (PVC's), where the number of restoration wavelengths may differ on different links of a cycle (hence the name "virtual cycles"). Upon a link or node failure, affected demands are rerouted to their preconfigured restoration routes and assigned restoration wavelengths without any knowledge of the precise failure location. When an end-node of a demand fails, the demand is lost and cannot be restored. Referring now to the figures and to FIG. 1 in particular, there is shown a flow chart 100 that describes the present invention.

Step 101 is prepare input where the input comprises:
G(N, A)=A network where N is the set of nodes and A is the set of links. Notation |•| is used to denote the number of elements in a set; e.g., |N| denotes the number of nodes in the network.

d=Index for demands; d=1, 2, 3, . . . , where D is the set of all demands. Demand d has end-nodes $i_d$ and $j_d$.

$P_d$=The working route used by demand d to connect its end-nodes $i_d$ and $j_d$ when demand d is not affected by a link or node failure. $\|P_d\|$ denotes the length of the working route.

$W_d$=The set of wavelengths required by demand d in its working route; d∈D.

H=The set of cycles in network G(N, A). This set is obtained by employing known techniques. The set H needs to be prepared only once for a given network topology and is thereafter used for multiple execution of designing a survivable network for different demand inputs.

h=Index for cycles; h∈H.

At step 102 the demands d∈D are sorted in non-increasing order of the number of wavelengths $|W_d|$ required by the demands.

At step 103 a demand is selected, say $d_1$, that has not yet been selected from the top of the sorted list of demands. This demand is referred to as the lead demand.

At step 104 all cycles in the set of cycles H that can restore the lead demand in the event of a link or node failure that affect the lead demand are found. A cycle can restore the lead demand if it has a restoration route on the cycle that connects both end-nodes of the demand and that does not overlap with any intermediate node of the working route of the lead demand. If a demand shares only its two end-nodes with the cycle, it is referred to as straddling demand and it has two restoration routes on the cycle. If the demand can be restored on the cycle, but is non-straddling, it has one restoration route on the cycle. The set of cycles that can restore demand d is denoted as $H_d$. In particular, $H_{d_1}$ is the set of cycles that can restore the lead demand $d_1$.

At step 105 the method selects a cycle not yet selected from among the set $H_{d_1}$.

At step 106 a large number of Preconfigured Virtual Cycles (PVC's) is generated, each of which may protect multiple demands. Consider the lead demand $d_1$ selected in step 103 and cycle $h_1$ selected in step 105. The method generates PVC $c_1$ by assigning to cycle $h_1$ the lead demand and possibly other demands. The following notations are used:

c=Index for PVC's; c=1, 2, 3, ..., where C is the set of all candidate PVC's generated.

$D_c$=The set of demands assigned to PVC c; c∈C. For each of the demands d∈$D_c$, the working route $P_d$ and the set $W_d$ of wavelengths used on the working route are known from the input.

$R_{dc}$=The restoration route on PVC c used by demand d to connect its end-nodes $i_d$ and $j_d$ when demand d is affected by a link or node failure.

$V_{dc}$=The set of wavelengths used by demand d in its restoration route on PVC c; d∈$D_c$. Set $V_{dc}$ may differ from $W_d$, but the number of restoration wavelengths in $V_d$, is |$V_{dc}$|=|$W_d$|.

$S_c$=Cost of PVC c. This cost is the sum over all links of PVC c of the number of restoration wavelengths on a link multiplied by the cost per wavelength on the link. The cost of a restoration wavelength on a link depends on the link length. Often, but not always, this cost is simply proportional to the link length. $S_c$ is readily computed from $R_{dc}$ and $V_{dc}$ for all d∈$D_c$ as this information implies the specific restoration wavelengths assigned on each of the links along the cycle.

Consider lead demand $d_1$ and cycle $h_1$ selected in step 105 from among the cycles in set $H_{d_1}$. The method generates a candidate PVC that would include demand $d_1$ and, perhaps, other demands. The resulting PVC is referred to as PVC $c_1$ and will be included in the set C of candidate PVC's. PVC $c_1$ is characterized by cycle $h_1$, the set $D_{c_1}$ of demands assigned, the restoration routes $R_{dc_1}$, and set of wavelengths $V_{dc_1}$ assigned to each of the demands d∈$D_{c_1}$, and the "cost" $S_{c_1}$ of the PVC. In addition, PVC $c_1$ specifies the demand information, including the working route $P_d$ and the set of wavelengths $W_d$ assigned to each of the demands d∈$D_{c_1}$.

Generation of the candidate PVC's is the most critical part of the method and will be explained later in detail.

At step 107 a check is made whether a PVC was generated for each of the cycles in H If not, the method returns to step 105 in order to select another cycle. If all cycles in $H_{d_1}$ were selected, the method continues with step 108.

At step 108 one more candidate PVC for demand $d_1$ is generated. Specifically, the shortest cycle in $H_{d_1}$ is selected and only demand $d_1$ is assigned to that cycle. Selecting this candidate PVC in the final solution is equivalent to providing dedicated restoration capacity to demand $d_1$. Computational results suggest that, typically, it is best to protect some demands through dedicated restoration capacity.

At step 109 a check is made whether all demands in D were selected in step 103. If not, the method returns to 103 in order to select the next demand in D. If all demands in D were selected, the method completed the generation of the set C of candidate PVC's. It should be noted that the number of candidate PVC's in C is a small fraction of all PVC's that can be generated. Nevertheless, the method is expected to select a subset of PVC's from among those in C which provides protection to all demands at a near-minimum restoration wavelengths cost.

At step 110 a set of PVC's is selected. First, duplications and dominated PVC's are eliminated from the set C of candidate PVC's. Consider PVC's $c_1$ and $c_2$. If $D_{c_1} \supseteq D_{c_2}$ and $S_{c_2} \leq S_{c_2}$, then PVC $c_2$ is deleted from the set C of candidate PVC's. The method then determines an optimal set of PVC's from among those remaining in C so that each of the demands in D is assigned to at least one PVC while minimizing the cost of selected PVC's. This optimization problem is well-known by the name set covering problem and it can be solved by commercially available integer programming solvers (e.g., the CPLEX software by ILOG Inc, an IBM company). These solvers are capable of solving very large set covering problems very fast. Let $x_c$=0, 1 be decision variable where $x_c$=1 if PVC c is selected and $x_c$=0 if it is not selected. Let $a_{dc}$=1 if demand d∈$D_c$ and $a_{dc}$=0 otherwise. The set covering problem is formulated as follows:

The Set Covering Problem $$\text{Min} \sum_{c \in C} S_c x_c$$

so that $$\sum_{c \in C} a_{dc} x_c \geq 1, \forall d \in D$$

$$x_c = 0, 1, \forall c \in C,$$

where C* refers to the optimal set of PVC's selected by the solution to the set covering problem.

Some of the demands in D may be assigned to multiple PVC's in C*. At step 111 demands that are assigned to multiple PVC's are deleted so that each of these demands will be assigned to a single PVC while attempting to maximize the decrease in the cost of the PVC's in C*. This can be achieved through various heuristic algorithms, for example, by deleting one demand from one PVC at a time; specifically, the demand that results in the largest cost decrease. A version of such an algorithm is described below, where DP refers to the set of demands that are assigned to more than one PVC.

Elimination of Duplications Algorithm
Initialization
For each demand d∈DP,
   For each PVC c∈C*,
     If d∈$D_c$ compute the cost reduction in PVC c if demand d is deleted from c.
   End.
End.
Elimination of a Demand from a PVC
Determine the demand-PVC combination, referred to as (d*, c*), that yields the largest cost reduction.
Delete demand d* from $D_{c*}$.
If demand d* is now assigned to only one PVC in C*, delete d* from DP.
If DP=∅, stop. Otherwise, re-compute, for each d∈DP∩$D_{c*}$, the cost reduction in PVC c* if demand d is deleted from c*.
Repeat "Elimination of a demand from a PVC".
End of Algorithm.

To reduce computation of the cost reductions at the risk of realizing less saving, it may be reasonable to keep restoration routes and wavelength assignments unchanged. Upon completion, a solution is obtained with C* as the selected set of PVC's, while each of the demands d∈D is assigned to exactly one of these PVC's.

At this point, in step 112 a near-optimal solution is determined comprising a set C* of PVC's where each of the demands d∈D is assigned to a single PVC c∈C*. Consider a specific demand $d_1$ assigned to PVC $c_1$. Demand $d_1$ is characterized by its working route $P_{d_1}$ and the set of wavelengths $W_{d_1}$ the demand uses on the working route. Demand $d_1$ has restoration route $R_{d_1 c_1}$ on PVC $c_1$. This restoration route uses the set $V_{d_1 c_1}$ of restoration wavelengths. The wavelengths assigned during the generation and selection of the PVC's ignored (i) possible conflicts between wavelengths assigned to working demands and those assigned to restoration routes, and (ii) possible conflicts between restoration wavelengths assigned in different PVC's. Consider PVC's $c_1$ and $c_2$, and suppose demand $d_1$ is assigned to PVC $c_1$ whereas demand $d_2$ is assigned to PVC $c_2$. Furthermore, suppose demands $d_1$ and $d_2$ have common failure scenarios and their restoration routes on PVC's $c_1$ and $c_2$ share one or more links. Then, if both demands fail, and their restoration wavelengths are overlapping, a conflict will arise.

The method provides an algorithm that guarantees that no wavelength conflicts will occur upon a link or node failure while attempting to minimize the overall number of different wavelengths used for restoration in the network. Let
$NV_c$=Number of different restoration wavelengths used in PVC c.
$RR_c$=Set of restoration routes in PVC c.
r, p=Indices for restoration routes in $RR_c$.
d(r)=The demand associate with restoration route r.
$I_{c_1 c_2}$ if PVC's $c_1$ and $c_2$ have joint links and if there is a demand in $D_{c_1}$ that has a common failure scenario with a demand in $D_{c_2}$.

Wavelengths Reassignment Algorithm
Sort the PVC's in C* in non-increasing order of $NV_c$.
While not all PVC's in C* are marked,
  Select from top of the list an unmarked PVC, say $c_1$.
  Find set $S_{c_1}$={all marked PVC's c∈C* for which $I_{c_1 c}$=1}.
  For each link m of PVC $c_1$, construct set $Q_m$={wavelengths that cannot be used by restoration routes of PVC $c_1$ on link m}. Forbidden wavelengths include those that: (i) are taken by some working route that uses link m, and (ii) are taken by some restoration route of a PVC in $S_{c_1}$ that uses link m.
  If $Q_m$=∅ for all links m of PVC $c_1$, mark PVC $c_1$ without changing the assigned wavelengths of all restoration routes in $RR_{c_1}$ and go to "End_2".
  Sort restoration routes in $RR_{c_1}$ in non-increasing order of (i) number of wavelengths required by the route, and (ii) number of links in the route.
    While not all restoration routes in $RR_{c_1}$ are selected,
    Select route r from top of the list. Note that route r is the restoration route of demand d(r) and it requires $|W_{d(r)}|$ wavelengths.
    Find the wavelengths that cannot be used by route r. These include: (i) union of all wavelengths in $Q_m$ for all links m included in route r, and (ii) wavelengths used by a previously selected route p∈$RR_{c_1}$ that has a common link with route r and d(r) and d(p) have a common failure scenario.
    Assign to route r the lowest $|W_{d(r)}|$ wavelengths that can be assigned.
    End_1.
End_2.
End of Algorithm.

A simpler algorithm can be used wherein each PVC is reduced to a node in a graph and a link connects nodes $c_1$ and $c_2$ if $I_{c_1 c_2}$=1. Node $c_1$ requires $NV_{c_1}$ restoration wavelengths, while adjacent nodes would have non-overlapping wavelength numbers (and a node cannot use wavelengths used by working routes that pass through links of the PVC represented by the node). Reassignment of wavelengths is then accomplished by solving a simplified version of the wavelengths reassignment algorithm described above. The solution may, though, require more restoration wavelengths.

At step 113 the network design is complete and protects all demands from any single link or node failure using preconfigured virtual cycles. The solution comprises the set C* of selected PVC's. For each PVC c∈C*, the method specifies the set of assigned demands $D_c$, where each demand is assigned to a single PVC in C*. For each of the demands, the method specifies its assigned restoration route and assigned restoration wavelengths. For example, consider demand $d_1$ assigned to PVC $c_1$, where demand $d_1$ is characterized by its working route $P_{d_1}$ and the set $W_{d_1}$ of wavelengths the demand uses on the working route. The method specifies demand $d_1$'s restoration route $R_{d_1 c_1}$ on PVC $c_1$ and the set $V_{d_1 c_1}$ of restoration wavelengths assigned to demand $d_1$ on its assigned restoration route.

PVC $c_1$ is generated by assigning lead demand $d_1$ and, perhaps, other demands to cycle $h_1$. The cost $S_{c_1}$ of PVC $c_1$ is the sum over all links of PVC $c_1$ of the number of restoration wavelengths on a link multiplied by the length of the link, and is readily computed from the restoration routes and restoration wavelengths assigned to the demands in $D_{c_1}$. The recorded design results in step 113 are incorporated into the network design to protect the network from a single link or node failure.

The discussion below explains how the method generates a PVC as stated in step 106 of FIG. 1.

Figure 2:
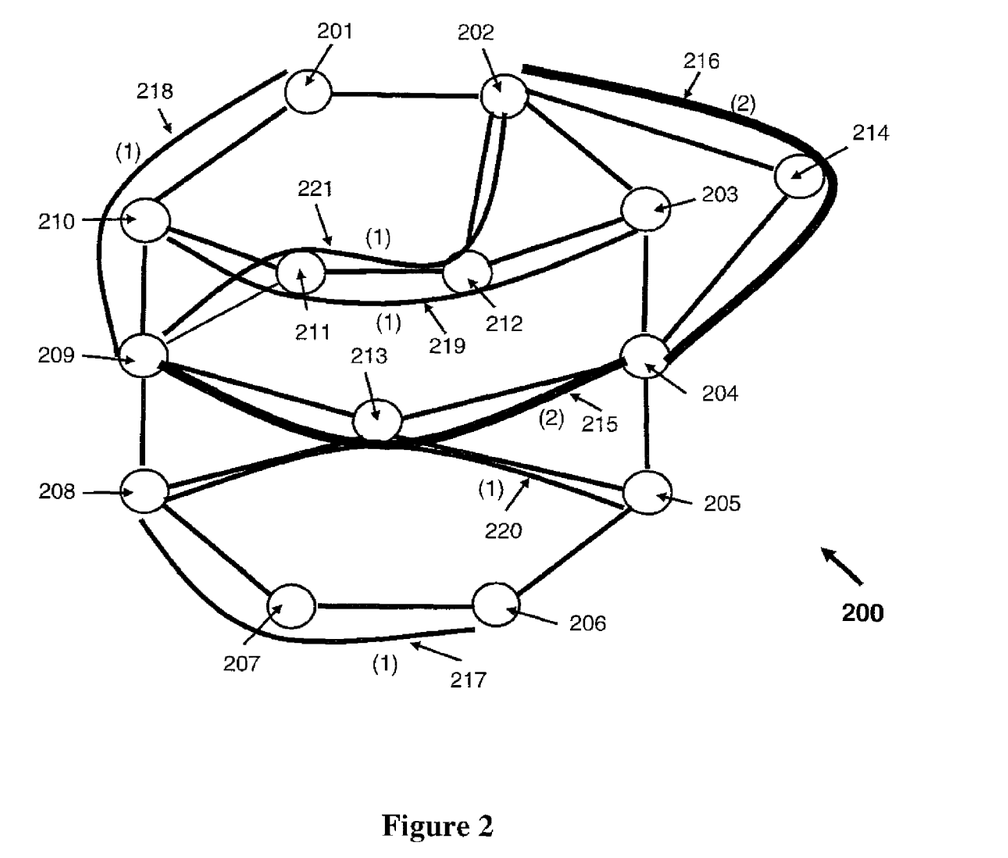
FIG. 2 shows a single preconfigured virtual cycle and the demands assigned to the cycle.

Referring now to FIG. 2, there is shown an example 200 of a single PVC and the demands assigned. Nodes 201 to 210 and the links (identified by the end-nodes) that interconnect these nodes (201, 202), (202, 203), . . . , (209, 210), (210, 201) specifies the restoration cycle under consideration. In addition, the figure shows several other nodes 211-214 and several other links that are not on the restoration cycle. The figure shows working routes of seven demands 215-221 and the number of wavelengths required by each (the specific wavelengths used on the working routes are not required here, but were required by the wavelengths reassignment algorithm in order to resolve wavelength conflicts). For example demand 215 is a connection between nodes 204 and 209, its working route includes links (204, 213) and (213, 209), and it requires two wavelengths.

Consider the generate PVC in step 106 in FIG. 1 for the cycle presented in FIG. 2 with demand 215 as the lead demand. The following illustrates the generation of the corresponding PVC. The method sorts the demands in a non-increasing order of the required number of wavelengths. The sorted list is not necessarily unique, but the lead demand must be the first on the list (no demands with more wavelengths than the lead demand would be assigned to this cycle). Suppose the sorted list is demands 215, 216, 217, 218, 219, 220, 221. Demand 215 is assigned restoration wavelengths 1 and 2 on, as yet, an undetermined restoration route (since it is a straddling demand, there are two alternatives). Next, since demand 216 has no common failure scenario with demand 215 (also referred to as disjoint demands), it is assigned restoration wavelengths 1 and 2 on an undetermined restoration route. Next, since demand 217 has no common failure scenario with previously assigned demands, it is assigned restoration wavelength 1 on restoration route (208, 209), (209, 210), . . . , (205, 206). Note that demand 217 is non-straddling and, thus, has a unique restoration route on the cycle. Next, since demand 218 has no common failure scenario with previously assigned demands, it is assigned restoration wavelength 1 on restoration route (201, 202), (202, 203), . . . , (208, 209). Next, since demand 219 has no common failure scenario with previously assigned demands, it is assigned restoration wavelength 1 on an undetermined restoration route. Next, demand 220 has a common failure scenario with demand 215, but these two demands can be assigned non-overlapping restoration routes. Therefore, demand 220 is assigned restoration wavelength 1 on restoration route (205, 206), (206, 207), (207, 208), and the restoration route of demand 215 is fixed as (209, 210), (210, 201), (201, 202), (202, 203), (203, 204). Next demand 221 has a common failure scenario with demand 219 and their restoration routes overlap. However, since demand 215 has no common failure with demand 221, it was already assigned restoration wavelengths 1 and 2 and its restoration route covers an entire restoration route of demand 221, demand 221 can be assigned restoration wavelength 2 on restoration route (209, 210), (210, 201), (201, 202) without using any new restoration wavelengths along its restoration route. Demand 221 is referred to as being "shadowed" by demand 215. If demand 221 could not be shadowed by a previously assigned demand, it would not be assigned to this PVC.

Note that only demands 216 and 219 remain with an undetermined restoration route. The method then assigns restoration route (202, 203), (203, 204) to demand 216 and restoration route (210, 201), (201, 202), (202, 203) to demand 219. It can now readily be seen that this PVC has two restoration wavelengths on links (209, 210), (210, 201), (201, 202), (202, 203), (203, 204) and a single restoration wavelength on links (204, 205), (205, 206), (206, 207), (207, 208), (208, 209) in order to protect the seven assigned demands from any single link or node failure.

The description below further explains the generation of a PVC. Consider lead demand $d_1$ and a specific cycle $h_1 \in H_{d_1}$. The method generates PVC $c_1$ that will provide restoration to $d_1$ and, perhaps, to other demands. Let $L_{h_1 d_1}$ be the set of all demands $d \in D$ that can be protected under link or node failure by cycle $h_1$ and that do not require more wavelengths than $d_1$. Limiting the demands considered for sharing in this way is justified since each demand will serve as the lead demand. In addition to the lead demand, the method considers assigning demands, one at a time, to cycle $h_1$, generating PVC $c_1$ under the following rules:

(a) A demand whose working route does not have a joint failure scenario with any previously assigned demand (end-nodes may be shared).

(b) A demand whose working route has common failure scenarios with previously assigned demands, but it has a restoration route that is non-overlapping with a restoration route of each of these demands.

(c) A demand whose working route has common failure scenarios and overlapping restoration routes with previously assigned demands, but it can share restoration wavelengths with a previously assigned demand with which it does not have common failure scenarios.

Rule (c) is illustrated again through FIG. 2. Suppose demand 215 was already assigned wavelengths 1 and 2 on restoration route (209, 210), (210, 201), (201, 202), (202, 203) and demand 219 was already assigned wavelength 1. Demand 221 can be assigned wavelength 2 "for free" since demand 215 has a restoration route that covers a restoration route of demand 221 and these two demands have no common failure scenario. Demand 215 is referred to as a "shadowing demand" and demand 221 is referred to as a "shadowed demand".

The method provides a heuristic algorithm that generates PVC $c_1$ for lead demand $d_1$ on cycle $h_1$. The algorithm consists of three parts executed sequentially:
  Demand Assignment Algorithm;
  Demand Routing Algorithm; and
  Drop Demands Algorithm.

In the version described below, the algorithm first assigns, one at a time, demands that satisfy rules (a) or (b). Thereafter, when no more demands can be assigned by these rules, it attempts to assign, one at a time, unassigned demands by rule (c); note that the latter assignments do not lead to an increase in the restoration capacity since the restoration route of a demand assigned by rule (c) is shadowed by another demand along its entire restoration route. Note that the demands assigned may depend on the order in which they are processed. Similar variants of demand assignments can be used, for instance, attempting to assign each of the demands, one at a time, based on rules (a), (b) and (c). The Demand Assignments Algorithm, described below, generates PVC $c_1$ associated with lead demand $d_1$ and cycle $h_1$.

Demand Assignment Algorithm
Initialization

Determine set $L_{h_1 d_1}$, where the demands in $L_{h_1 d_1}$ are sorted in non-increasing order of the number of required wavelengths. Let demand $d_1$ be at the top of the list.

Initialize $M=\emptyset$.

Assignment of Demands [Rules (a) and (b)]

While there are unselected demands in $L_{h_1 d_1}$,

Select from top of the list demand d that was not yet selected (selecting demands in this order will, in general, yield better results; however, other selection rules, such as random selection can be used).

If d does not share a common failure scenario with any of the previously assigned demands to PVC $c_1$, then, assign demand d to PVC $c_1$ with restoration wavelengths $V_{dc_1}=\{1, 2, \ldots, |W_d|\}$. If d is non-straddling, fix its restoration route $R_{dc_1}$ (it is unique); otherwise, if d is straddling, leave its restoration route undetermined.

If d was assigned, go to select next demand on the list; otherwise continue.

Suppose d shares a common failure scenario with at least one of the previously assigned demands to PVC $c_1$. Then, (a) If these previously assigned demands and d can be routed so that d's restoration route does not overlap with a restoration route of these previously assigned demands, then: Assign demand d to PVC $c_1$ with restoration wavelengths $V_{dc_1}=\{1, 2, \ldots, |W_d|\}$ and fix the routes of these demands (unless already fixed) and of d.

(b) If d was not assigned, place d in a list M.

End.

Assignment of Demands [Rule (c)]

While there are unselected demands in list M,
  Note: M is already sorted like $L_{h_1 d_1}$.
  Select from top of the list demand d that was not yet selected.

Suppose d has common failure scenarios with a set S of previously assigned demands to PVC $c_1$.
    (a) Find the set of all wavelengths that do not exceed $|W_{d_1}|$ and that are not assigned to any of the demands in S whose fixed (or shorter if not fixed) restoration route overlaps the shorter restoration route of d (in case of a tie, select arbitrarily). Let K denote the set of these wavelengths. If K includes less than $|W_d|$ wavelengths, demand d is not assigned and the algorithm proceeds with next demand in M.

(b) Find all previously assigned demands that shadow demand d. Demand e shadows d if it satisfies the following conditions: (i) Its restoration wavelengths include at least $|W_d|$ wavelengths that are also in K; (ii) it does not share common failure scenarios with d; and (iii) the shorter restoration route of d is in e's fixed (or shorter if not fixed) restoration route. If no shadowing demands exist, demand d is not assigned and the algorithm proceeds with the next demand in M.

(c) Select a shadowing demand, say, demand e (first priority should be given to a demand whose routing has already been fixed), assign demand d to PVC $c_1$ and fix the routing of all the demands not yet fixed in $S' \cup \{d\} \cup \{e\}$ to their shorter routes (where S' includes the demands in S whose shorter restoration route does not overlap with the selected restoration route of d). Assign d the lowest $|W_d|$ restoration wavelengths in K that are also used by demand e.

End.
End of Algorithm.

During the assignment algorithm, some of the straddling demands assigned by rule (a) may not have their restoration route fixed. Note that in the assignment procedure for demands in the set M, the algorithm enforced the use of the shortest restoration routes for some of the demands involved (unless the routes were already fixed) in order to limit the search while still achieving effective use of restoration capacity. Alternatively, the algorithm may search for a combination of restoration routes that would facilitate shadowing at the expense of additional computational effort. Note that the presentation above ignores possible wavelength conflicts with wavelengths of working routes or with restoration wavelengths in other PVC's. Wavelength conflicts are resolved in step 112 of FIG. 1.

Next, the method provides a routing algorithm that fixes restoration routes that have not yet been fixed on PVC $c_1$. Since all demands with undetermined routes are disjoint with no common failure scenario, it can be shown that it is optimal to fix their restoration routes so that there is some link on cycle $h_1$ that does not carry any of these restoration routes. Let Q be the set of all demands assigned to PVC $c_1$ whose restoration routes have not been fixed, and let ENQ be the set of end-nodes of the demands with undetermined restoration routes. The routing Algorithm is described below for PVC $c_1$.

Routing Algorithm
For each end-node in set ENQ,
  Consider end-node i. Determine restoration route for each of the demands in Q that avoids the link that is clockwise from node i on cycle $h_1$.
  Evaluate the total restoration capacity on PVC $c_1$ reserved under the routing above for all assigned demands (including those fixed during the demand assignment algorithm).
End.
Select the minimum-cost solution and fix the restoration routes of all the demands in Q accordingly.
End of Algorithm.

At this point, the method assigned a set of demands to PVC $c_1$. Each of these demands was assigned restoration wavelengths and a restoration route. However, it may be the case that deleting some of these demands from this PVC may lead to a better overall set of candidates. In principle, exchanges of demands among candidate PVC's can be explored, however, this approach may require significant computational effort. Instead, a more narrow search can be used to delete a demand from a PVC if the decrease in restoration capacity in the PVC exceeds the restoration capacity used by a PVC that provides dedicated restoration to that demand. Let $\Delta_{c_1}$ be the set of demands assigned to PVC $c_1$. A version of a heuristic for dropping demands from a PVC, referred to as Drop Demand Algorithm, is presented below for PVC $c_1$. Other variants can obviously be used.

Drop Demands Algorithm
Sort the demands in $\Delta_{c_1}$ in non-increasing order of their restoration route length multiplied by the number of wavelengths required by the demand.
For each demand $d \in \Delta_{c_1}$,
  Compute the cost reduction of PVC $c_1$ if demand d is deleted. (Computation of the objective function can be simplified by keeping restoration routes and wavelength assignments unchanged at the risk of underestimating the savings.)
  Compute the savings relative to protecting this demand by the least-cost PVC that provides dedicated restoration to demand d.
  If the savings is positive, drop the demand from PVC $c_1$.
End.
End of Algorithm.

This completes the detailed description of generating PVC $c_1$, as noted in step 106 of FIG. 1.

The present invention can readily be modified to handle the case when restoration routes of each of the demands can be split among multiple restoration routes. While generating candidate PVC's, each demand is assumed to require only one wavelength. Hence, the demand assignment algorithm is simplified since rule (c) does not apply. In the solution to the set covering problem used for selecting an optimal set of PVC's, each of the cycles may be selected multiple times so that each of the demands $d \in D$ will be assigned at least $|W_d|$ times. As a result, each demand may be assigned to different selected PVC's with one or more wavelength on each of these PVC's, and restoration wavelengths of a straddling demand may be split between the two restoration routes on the same PVC.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc. A module may be a component of a device, software, program, or system that implements some "functionality", which can be embodied as software, hardware, firmware, electronic circuitry, or etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server, and/or embedded system.

While there has been described and illustrated a method for network restoration under link or node failure using preconfigured virtual cycles, it will be apparent to those skilled in the art that modifications and variations are possible without deviating from the principles and broad teachings of the present invention which shall be limited solely by the scope of the claims appended hereto.

What is claimed is:

1. A method for designing survivable optical networks that provide end-to-end path restoration to a plurality of demands in the event of a single link or node failure in an optical network using a plurality of preconfigured virtual cycles, where a preconfigured virtual cycle may have a different number of restoration wavelengths on different links and where in the event of a failure each of the affected demands is rerouted onto a single preconfigured restoration route on a segment of a cycle using the number of pre-specified restoration wavelengths required by the demands without resorting to intermediate switching or wavelength conversions on the restoration route, comprising the steps of:
  (a) generating a plurality of candidate preconfigured virtual cycles (PVC's), and each such PVC restores a plurality of demands in the optical network including demands that have no common failure scenarios, demands that have common failure scenarios and non-overlapping restoration routes, and demands that have common failure scenarios and can share restoration wavelengths with some demand with which there is not a common failure scenario, where a demand can be restored by a preconfigured virtual cycle if both end-nodes of the demand are on the cycle and if there exists a restoration route on a segment of the cycle that has no common failure scenario with a working route of the demand;
  (b) selecting a set of preconfigured virtual cycles from among all candidate preconfigured virtual cycles so that each of the demands in the optical network is protected by one cycle while achieving a near-minimum total restoration wavelengths cost in the network;
  (c) resolving wavelength conflicts among restoration routes and demand working routes and among restoration routes on different preconfigured virtual cycles that share one or more links; and
  (d) incorporating the plurality of selected preconfigured virtual cycles, demands assigned to each of these cycles, and restoration route and restoration wavelengths assigned to each of the demands into the optical network thereby forming a survivable optical network.

2. The method as set forth in claim 1, wherein in the event of a failure each of the affected demands is rerouted onto a single preconfigured restoration route on a segment of a pre-configured virtual cycle without any knowledge of the failure location.

3. The method as set forth in claim 1, wherein said generating a plurality of candidate preconfigured virtual cycles finds for each demand, referred to as lead demand, all topological cycles in the network that can restore the lead demand and generates a preconfigured virtual cycle for each of the lead demand-cycle combinations by attempting to assign non-lead demands to said preconfigured virtual cycle.

4. The method as set forth in claim 3, wherein said generating a plurality of candidate preconfigured virtual cycle is performed for lead demand-cycle combination by using steps of Demand Assignment Algorithm, followed by using steps of Routing Algorithm, followed by using steps of Drop Demands Algorithm.

5. The method as set forth in claim 1, wherein said selecting a set of preconfigured virtual cycles is performed by first solving The Set Covering Problem, where the solution to said problem selects a set of preconfigured virtual cycles from among all candidate preconfigured virtual cycles so that each of the demands is restored in at least one preconfigured virtual cycle while minimizing total restoration wavelengths cost, and then by using the steps of Elimination of Duplications Algorithm so that each demand is restored in a single preconfigured virtual cycle.

6. The method as set forth in claim 1, wherein said resolving wavelength conflicts is performed by using steps of Wavelengths Reassignment Algorithm.

7. The method as set forth in claim 1, where each demand is restored by splitting the number of restoration wavelengths required by the demands across multiple restoration routes in the same or different preconfigured virtual cycles.

8. A method for designing survivable optical networks that provide end-to-end path restoration to a plurality of demands in the event of a single link or node failure in an optical network using a plurality of preconfigured virtual cycles, where a preconfigured virtual cycle may have a different number of restoration wavelengths on different links and where in the event of a failure each of the affected demands is rerouted onto a single preconfigured restoration route on a segment of a cycle using the number of pre-specified restoration wavelengths required by the demands without resorting to intermediate switching or wavelength conversions on the restoration route, comprising the steps of:
  (a) generating a plurality of candidate preconfigured virtual cycles where each such candidate can restore a plurality of demands;
  (b) selecting a set of preconfigured virtual cycles from among all candidate preconfigured virtual cycles so that each of the demands in the optical network is protected by one cycle while achieving a near-minimum total restoration wavelengths cost in the network;
  (c) resolving wavelength conflicts among restoration routes and demand working routes and among restoration routes on different preconfigured virtual cycles that share one or more links;
  (d) incorporating the plurality of selected preconfigured virtual cycles, demands assigned to each of these cycles, and restoration route and restoration wavelengths assigned to each of the demands in the optical network thereby forming a survivable optical network.

9. The method as set forth in claim 8, wherein in the event of a failure each of the affected demands is rerouted onto a single preconfigured restoration route on a segment of a pre-configured virtual cycle without any knowledge of the failure location.

10. The method as set forth in claim 8, wherein said generating a plurality of candidate preconfigured virtual cycles finds for each demand, referred to as lead demand, all topological cycles in the network that can restore the lead demand and generates a preconfigured virtual cycle for each of the lead demand-cycle combination by attempting to assign non-lead demands to said preconfigured virtual cycle.

11. The method as set forth in claim 10, wherein said generating candidate preconfigured virtual cycle is performed by assigning, one at a time, a restorable demand that has no common failure scenarios with previously assigned demands to the cycle, or has common failure scenarios with previously assigned demands but has non-overlapping restoration routes with the common failure scenarios demands, or it has common failure scenarios with previously assigned demands but can share restoration wavelengths with a previously assigned demand with which there is no common failure scenario.

12. The method as set forth in claim 11, wherein said assigning a restorable demand is followed by determining restoration routes to assigned demands and dropping a demand from a preconfigured virtual cycle when the demand can be restored at a lesser cost on another preconfigured virtual cycle.

13. The method as set forth in claim 8, wherein said selecting a set of preconfigured virtual cycles is performed by first solving an optimization problem that selects a set of preconfigured virtual cycles from among all candidates so that each of the demands is restored in at least one preconfigured virtual cycle while minimizing total restoration wavelengths cost, and then deleting demands that are assigned to multiple preconfigured cycles from one cycle at a time until each of the demands is assigned to a single preconfigured virtual cycle.

14. The method as set forth in claim 8, wherein said resolving wavelength conflicts is performed by reassigning restoration wavelengths to one preconfigured virtual cycle at a time to avoid conflicts with wavelengths assigned to working demands and with wavelengths already assigned to restoration routes on said preconfigured virtual cycle and other preconfigured virtual cycles while keeping the number of different restoration wavelengths used in the network to a minimum.

15. The method as set forth in claim 8, where each demand is restored by splitting the required number of restoration wavelengths required by the demands across multiple restoration routes in the same or different preconfigured virtual cycles.

16. A computer system for designing survivable optical networks that provide end-to-end path restoration to a plurality of demands in the event of a single link or node failure in an optical network using a plurality of preconfigured virtual cycles, where a preconfigured virtual cycle may have a different number of restoration wavelengths on different links and where in the event of a failure each of the affected demands is rerouted onto a single preconfigured restoration route on a segment of a cycle using the number of pre-specified restoration wavelengths required by the demands without resorting to intermediate switching or wavelength conversions on the restoration route, comprising:
  (a) means for generating a plurality of candidate preconfigured virtual cycles (PVC's), and each such PVC restores a plurality of demands in the optical network including demands that have no common failure scenarios, demands that have common failure scenarios and non-overlapping restoration routes, and demands that have common failure scenarios and can share restoration wavelengths with some demand with which there is not a common failure scenario, where a demand can be restored by a preconfigured virtual cycle if both end-nodes of the demand are on the cycle and if there exists a restoration route on a segment of the cycle that has no common failure scenario with a working route of the demand;
  (b) means for selecting a set of preconfigured virtual cycles from among all candidate preconfigured virtual cycles so that each of the demands in the optical network is protected by one cycle while achieving a near-minimum total restoration wavelengths cost in the network;
  (c) means for resolving wavelength conflicts among restoration routes and demand working routes and among restoration routes on different preconfigured virtual cycles that share one or more links; and
  (d) means for incorporating the plurality of selected preconfigured virtual cycles, demands assigned to each of these cycles, and restoration route and restoration wavelengths assigned to each of the demands into the optical network thereby forming a survivable optical network.

17. The computer system as set forth in claim 16, wherein in the event of a failure each of the affected demands is rerouted onto a single preconfigured restoration route on a segment of a preconfigured virtual cycle without any knowledge of the failure location.

18. The computer system as set forth in claim 16, wherein said means for generating a plurality of candidate preconfigured virtual cycles finds for each demand, referred to as lead demand, all topological cycles in the network that can restore the lead demand and generates a preconfigured virtual cycle for each of the lead demand-cycle combinations by attempting to assign non-lead demands to said preconfigured virtual cycle.

19. The computer system as set forth in claim 18, wherein said means for generating a plurality of candidate preconfigured virtual cycle is performed for such lead demand-cycle combination by using the steps of Demand Assignment Algorithm, followed by using steps of Routing Algorithm, followed by using steps of Drop Demands Algorithm.

20. The computer system as set forth in claim 16, wherein said means for selecting a set of preconfigured virtual cycles is performed by first solving The Set Covering Problem, where the solution to said problem selects a set of preconfigured virtual cycles from among all candidates so that each of the demands is restored in at least one preconfigured virtual cycle while minimizing total restoration wavelengths cost, and then by using the steps of Elimination of Duplications Algorithm so that each demand is restored in a single preconfigured virtual cycle.

21. The computer system as set forth in claim 16, wherein said means for resolving wavelength conflicts is performed by using steps of Wavelengths Reassignment Algorithm.

22. The computer system as set forth in claim 16, where each demand is restored by splitting the number of restoration wavelengths required by the demands across multiple restoration routes in the same or different preconfigured virtual cycles.

23. A computer system for designing survivable optical networks that provide end-to-end path restoration to a plurality of demands in the event of a single link or node failure in an optical network using a plurality of preconfigured virtual cycles, where a preconfigured virtual cycle may have a different number of restoration wavelengths on different links and where in the event of a failure each of the affected demands is rerouted onto a single preconfigured restoration route on a segment of a cycle using the number of pre-specified restoration wavelengths required by the demands without resorting to intermediate switching or wavelength conversions on the restoration route, comprising:
  (a) means for generating a plurality of candidate preconfigured virtual cycles where each such cycle can restore a plurality of demands in the optical network;
  (b) means for selecting a set of preconfigured virtual cycles from among all candidate preconfigured virtual cycles so that each of the demands in the optical network is protected by one cycle while achieving a near-minimum total restoration wavelengths cost in the network;
  (c) means for resolving wavelength conflicts among restoration routes and demand working routes and among restoration routes on different preconfigured virtual cycles that share one or more links;

(d) means for incorporating the plurality of selected preconfigured virtual cycles, demands assigned to each of these cycles, and restoration route and restoration wavelengths assigned to each of the demands in the optical network thereby forming a survivable optical network.

24. The computer system as set forth in claim 23, wherein in the event of a failure each of the affected demands is rerouted onto a single preconfigured restoration route on a segment of a preconfigured virtual cycle without any knowledge of the failure location.

25. The computer system as set forth in claim 23, wherein said means for generating a plurality of candidate preconfigured virtual cycles finds for each demand, referred to as lead demand, all topological cycles in the network that can restore the lead demand and generates a preconfigured virtual cycle for each of the lead demand-cycle combination by attempting to assign non-lead demands to said preconfigured virtual cycle.

26. The computer system as set forth in claim 25, wherein said means for generating candidate preconfigured virtual cycles is performed by assigning, one at a time, a restorable demand that has no common failure scenarios with previously assigned demands to the cycle, or has common failure scenarios with previously assigned demands but has non-overlapping restoration routes with the common failure scenarios demands, or it has common failure scenarios with previously assigned demands but can share restoration wavelengths with some previously assigned demand with which there is no common failure scenario.

27. The computer system as set forth in claim 26, wherein said assigning a restorable demand is followed by determining restoration routes to assigned demands and dropping a demand from a preconfigured virtual cycle when the demand can be restored at less cost on another preconfigured virtual cycle.

28. The computer system as set forth in claim 23, wherein said means for selecting a set of preconfigured virtual cycles is performed by first solving an optimization problem that selects a set of preconfigured virtual cycles from among all candidates so that each of the demands is restored in at least one preconfigured virtual cycle while minimizing total restoration wavelengths cost, and then deleting demands that are assigned to multiple preconfigured cycles from one cycle at a time until each of the demands is assigned to a single preconfigured virtual cycle.

29. The computer system as set forth in claim 23, wherein said means for resolving wavelength conflicts is performed by reassigning restoration wavelengths to one preconfigured virtual cycle at a time to avoid conflicts with wavelengths assigned to working demands and with wavelengths already assigned to restoration routes on said preconfigured virtual cycle and other preconfigured virtual cycles while keeping the number of different restoration wavelengths used in the network to a minimum.

30. The computer system as set forth in claim 23, where each demand is restored by splitting the required number of restoration wavelengths across multiple restoration routes in the same or different preconfigured virtual cycles.

* * * * *

UNITED STATES PATENT AND TRADEMARK OFFICE
CERTIFICATE OF CORRECTION

| | | |
|---|---|---|
| PATENT NO. | : 8,774,627 B2 | |
| APPLICATION NO. | : 13/587495 | |
| DATED | : July 8, 2014 | |
| INVENTOR(S) | : Luss et al. | |

It is certified that error appears in the above-identified patent and that said Letters Patent is hereby corrected as shown below:

In the Specification

In Column 1, Line 5, below TITLE, insert -- GOVERNMENT LICENSE RIGHTS
This invention was made with U.S. Government support under DARPA contract N00173-08-C-2011. The U.S. government has certain rights in the invention. --.

In Column 5, Line 31, delete "$V_d$," and insert -- $V_{dc}$ --, therefor.

In Column 5, Line 46, delete "$R_{dc1}$," and insert -- $R_{dc1}$ --, therefor.

In Column 5, Line 54, delete "in H" and insert -- in $H_{d1}$. --, therefor.

In Column 6, Line 10, delete "$S_{c2} \leq S_{c2}$," and insert -- $S_{c1} \leq S_{c2}$, --, therefor.

In Column 6, Line 51, delete "d∈$D_c$." and insert -- d∈$D_c$, --, therefor.

In Column 7, Line 32, delete "$Ic_1c_2$ if" and insert -- $Ic_1c_2 = 1$ if --, therefor.

In Column 7, Line 39, delete "$Ic_1c = 1$}." and insert -- $Ic_1c_2 = 1$}. --, therefor.

In the Claims

In Column 14, Line 15, in Claim 7, delete "where" and insert -- wherein --, therefor.

In Column 15, Line 28, in Claim 15, delete "where" and insert -- wherein --, therefor.

In Column 16, Line 39, in Claim 22, delete "where" and insert -- wherein --, therefor.

In Column 18, Line 25, in Claim 30, delete "where" and insert -- wherein --, therefor.

Signed and Sealed this
Fourteenth Day of October, 2014

Michelle K. Lee
*Deputy Director of the United States Patent and Trademark Office*